(12) United States Patent
Garnier et al.

(10) Patent No.: US 6,186,578 B1
(45) Date of Patent: Feb. 13, 2001

(54) FIXED GLAZING IN CONTACT WITH A PERIPHERAL SEAL FOR IMPROVED ACOUSTIC PROTECTION

(75) Inventors: Gilles Garnier, Thourotte; Marc Rehfeld, Ezanville, both of (FR)

(73) Assignee: Saint-Gobain Vitrage, Courevoie (FR)

( * ) Notice: Under 35 U.S.C. 154(b), the term of this patent shall be extended for 0 days.

(21) Appl. No.: 09/166,851

(22) Filed: Oct. 6, 1998

(30) Foreign Application Priority Data

Oct. 6, 1997 (FR) .................................................. 97 12407

(51) Int. Cl.[7] .................................. B60J 1/02; E04B 1/82
(52) U.S. Cl. .................... 296/146.1; 296/84.1; 296/90; 181/284; 181/289
(58) Field of Search .............................. 296/146.1, 84.1, 296/78.1, 90; 181/284, 289, 290

(56) References Cited

U.S. PATENT DOCUMENTS

| | | | |
|---|---|---|---|
| 4,488,753 | * 12/1984 | Koike | 296/201 |
| 4,614,676 | 9/1986 | Rehfeld . | |
| 4,854,636 | * 8/1989 | Greenhalgh et al. | 296/84.1 |
| 5,368,917 | * 11/1994 | Rehfeld et al. | 428/215 |
| 5,887,393 | * 3/1999 | Vanark et al. | 296/901 |

FOREIGN PATENT DOCUMENTS

| | | | |
|---|---|---|---|
| 2 525 677 | 10/1983 | (FR) . | |
| 948026 | * 1/1964 | (GB) | 296/84.1 |
| 1 175 739 | 8/1985 | (RU) . | |

OTHER PUBLICATIONS

Patent Abstracts of Japan, vol. 097, No. 012, Dec. 25, 1997, JP 09 202269, Aug. 5, 1997.
Patent Abstracts of Japan, vol. 097, No. 011, Nov. 28, 1997, JP 09 193651, Jul. 29, 1997.
K. Naghshineh, et al., Journal of Acoustical Society of America, vol. 92, No. 2, pp. 841–855, "Material Tailoring of Structures to Achieve a Minimum Radiation Condition", Aug., 1992.

* cited by examiner

*Primary Examiner*—D. Glenn Dayoan
*Assistant Examiner*—Greg Blankenship
(74) *Attorney, Agent, or Firm*—Oblon, Spivak, McClelland, Maier & Neustadt, P.C.

(57) ABSTRACT

A window pane fixed to an automobile via a peripheral joint forms at least a part of a wall defining a cabin of the vehicle. The window pane, at the peripheral joint, is constructed so as to eliminate at least one mode of acoustic radiance from the pane to a cavity defined by the cabin when the pane is excited by an acoustic field.

8 Claims, 3 Drawing Sheets

FIXED GLAZING IN CONTACT WITH A PERIPHERAL SEAL FOR IMPROVED ACOUSTIC PROTECTION

BACKGROUND OF THE INVENTION

1. Field of the Invention

The invention concerns a fixed glazing for improved acoustic protection for vehicles, specifically for automobiles, which is in contact with a peripheral seal. According to the invention, the glazing lacks one or more modes of radiation which are coupled with one or more acoustic cavity modes of the vehicular interior when the glass is excited by an acoustic field.

2. Discussion of the Background

Among the comfort qualities in modern transportation, such as in trains and automobiles, silence is crucial. Indeed, the other sources of discomfort—mechanical, of thermal origin, visibility problems, etc, —have been more or less taken care of. However, improving acoustic comfort presents new problems. It has been partly possible to deal with noises stemming from aerodynamics at their source, that is, noise created by air turbulence. This means that for economizing on energy, the shapes have been modified. Air penetration has been improved, and the turbulence which is itself a source of noise has been diminished.

Among the walls of a vehicle that separate the source of exterior aerodynamic noise from the interior space where the passenger sits, the glass is much more difficult to deal with. One cannot use the pasty or fibrous noise absorbing materials in glass like the ones used in opaque walls, and for reasons of weight, the glass thickness cannot be excessively increased. European patent EP-B1-0387 148 proposes glass which provides good insulation against noise of aerodynamic origin without increasing weight and/or thickness too much. This patent proposes a laminated glazing, the insert of which possesses good sound deadening properties.

Other noises such as motor noises, rolling noises or suspension noises must also be dealt with. These noises have already been dealt with at their origin or, in part, during their propagation, either through the air ( by absorbent sheeting in particular) or through solids (elastomer connecting elements, for example). In contrast, the design of glass so as to absorb noise which has its origin in the vehicle itself, that is, noise transmitted by way of the air or by the intermediary of solids, is more difficult to realize and is yet to be mastered.

The glazing constitutes an important surface of the interior of the vehicle and, consequently, an important surface of propagation. It turns out that using adapted connecting pieces is insufficient for avoiding the propagation of noise due to vibration of the glass, and that at certain speeds of rotation of the motor, a humming occurs that is perceptible by the passenger and thus becomes a source of discomfort. In fact, the rotation of the motor creates vibrations which are transmitted to the glass panes through the air or through solids.

The main parameters influencing the vibro-acoustic behavior of glass panes in this respect reside in the shape of the glass, the structure of the glass, the glass/interior interface, the exciting source and the mode of propagation. Thus, for a given vehicle, the ways of improving the behavior of the panels which the glass panes constitute include the structure of the glass as well as in the glass/vehicle interface.

Numerous efforts have been undertaken in modifying the structure of the glass in order to improve the sound muffling effect in the vehicle interior. In general, one can modify the construction of laminated glass panes, the insert of which possesses properties conferring protection against aerodynamic sound and/or noises of aerial origin and/or noise of solid origin, as well as the creation of multiple, panes of glass. In contrast, the use of such glass in the assembly of a vehicle considerably increases the cost of the vehicle.

SUMMARY OF THE INVENTION

The invention has for an object providing a fixed glass pane in contact with a peripheral seal for a vehicle, and specifically for an automobile, which provides good noise protection, in particular for noise propagated through air or solids, and without considerably increasing the cost of the vehicle.

This and other objects are accomplished in accordance with the invention by a fixed pane of glass in contact with a peripheral seal for a vehicle, and specifically for an automobile, such glass being constructed so as to eliminate at least one mode of acoustic propagation to the cavity defined by the vehicle interior space when such a pane of glass is excited by an acoustic field. By an acoustic field is understood the entirety of sounds created by aerial propagation and transmission of vibrations by intermediary of solids. The structure of the glass is not limited to a monolithic glazing. All types of laminated glazing and multiple glass panes are within the scope of the invention. Likewise, the shape of the glass is not a limitation on the invention. All shapes possible for a fixed glazing destined for a vehicle are within the scope of the invention.

The fixed glazing according to the invention permits diminishing the effect of humming perceptible by the passenger at certain motor rotation speeds, by eliminating the forms of propagation which are linked to the shape of the acoustic cavity formed by the vehicle interior space. In fact, at certain motor vibration frequencies, that is, at certain motor rotation speeds, the glass and the cavity of the interior of the vehicle are each modes of propagation, the coupling of which amplifies the humming noises originating in the operation of the motor. Thus, in eliminating these modes of propagation, one eliminates the amplified effect of humming and increases the acoustic comfort of the passenger.

A modal analysis of the interior of the vehicle permits one to determine the frequency in which the humming caused by the coupling of a mode of propagation of a vehicle glass with a mode of propagation by the cavity of the interior space occurs. For this, one varies the engine speed of the vehicle and surveys the curve of the cavity modes of the volume of the interior. The coupling frequency appears as a significant peak with an accuracy on the order of ±5%. In the fixed glass of the invention, it is possible to eliminate this mode of propagation.

According to an embodiment of the invention, the fixed glass is modified to eliminate the first odd mode of propagation. "Odd mode" means that the glass pane defines an odd number of zones of propagation, and "even mode" means that the glass pane defines an even number of zones of transmission. Thus the first odd mode means the case where the glass pane has one zone of propagation. In this way, when the aforementioned glass of the invention is excited by an acoustic field, it possess at least two zones of transmission.

The fixed glass of the invention permits diminishing the radiation of the glass thanks to elimination of the first odd mode of propagation. In fact, the first odd mode is the most propagating mode owing to its single zone of radiation.

Thus, in eliminating this form of propagation, one diminishes transmission by the glass overall by the presence of at least two zones of radiation.

According to a preferred embodiment of the invention, the fixed glass is deprived of all of the odd modes of propagation when it is excited by an acoustic field. In this manner, when this glass is excited by an acoustic field, it possesses an even number of zones of transmission, that is to say, zones of radiation in phase opposition.

The fixed glass of the invention permits diminishing the overall propagation of the aforementioned glass to zones of radiation in phase opposition. In fact, the phase difference of the zones permits obtaining a compensation effect of these zones by each other. In image fashion, when one zone pulls in one direction, the other zone will push in the opposite direction. Thus the vibratory effect of the sum of these zones tends toward a null effect and the active radiation is strongly diminished. By diminishing the propagation, one diminishes the transmission of noises and consequently improves the acoustical comfort in the interior of the vehicle.

According to a preferred form of construction of the fixed glass of the invention, the movement of this glass in the peripheral seal is locally diminished. The inventors have determined that by locally modifying the fixed glass/interior connection at the peripheral seal, one can modify the radiation of the glass and in particular, one can realize a diminution of radiation. Thus the diminution of the motion of the glass in the peripheral seal only on one restricted part of the periphery permits creating a glazing deprived on at least the first odd mode of radiation when the latter is excited by an acoustic field.

For each type of well defined glass, it is necessary to determine the zone or zones of the glass, the displacement of which will be diminished in the peripheral seal. For this reason, a series of measurements are conducted according to which one moves one or more blocks along the periphery of the glass between the peripheral seal and the edge of the glass, the displacement being regulated along a distance of 5 cm. For each position of the blocks, one surveys the mode of radiation of the glass on the basis of a modal analysis. The curves so obtained permit determining which positions of the block eliminate the odd modes of radiation when the glass is excited by an acoustic field.

According to one embodiment of the invention, the fixed glass contains at least one point of bending at its contact with the peripheral seal. "Point of bending" means a point deformation of the glass. This point deformation permits locally increasing the support of the glass in the peripheral seal by flattening, but locally diminishing its possibility of displacement locally.

According to another embodiment of the invention, the fixed glass has at least one extra thickness at its contact with the peripheral seal. This extra thickness can be realized by all means known to specialists such as, for example, with the aid of a pellet which one bonds on the edge of the glass, or with the aid of a section element which one positions on the edge of the glass, for example, by encapsulation or by extrusion, or even with the help of a peripheral framing of the glass, the thickness of which varies along its length. Any other means intended to implement an extra thickness of the glass at its contact with the peripheral seal is within the scope of the invention. The function of this local extra thickness is identical to that of the point attachment.

According to another variant of the invention, the peripheral joint has at least one clip or hook that comes in contact with the fixed glass. By clip or hook is understood to mean any element that can be integrated in a joint and that produces a compression force on the glass above the joint. Thus, it is possible to increase the hold of the glass in the peripheral joint. The integration of such elements in the peripheral joint can be realized by any means known in the art.

According to another variant of the invention, the peripheral joint is constrained on at least a portion of its length. "Constrained" is understood to mean the modification of the joint on at least a portion of its length in such a way that its contact with the glass is modified so that the displacement of the glass in the joint is not identical on the total length of the joint. Preferably, "constrain" is understood to mean that the forces of pressure exerted by the peripheral joint on the edge of the glass are locally increased, to thus locally increase the hold of the glass in the joint.

The invention concerns also a peripheral joint destined to receive a fixed acoustic protection glass for vehicles, and notably for automobiles. According to the invention, the peripheral joint is such that it locally reduces the thickness of the fixed glass that is in contact with it. A local reduction of the fixed glass in the joint allows for the reduction of the radiance of the glass due to the elimination of at least the first mode of odd radiance.

According to a variant of the invention, the peripheral joint presents a differentiated stiffness. This way, the displacement of the fixed glass in the joint is not identical along the total length of this joint and the radiance of the glass is modified.

According to another variant of the invention, a clip or hook is attached on the peripheral joint and is in contact with the glass when it is placed in the joint. The clip or hook produces pressure on the fixed glass and thus reduces, in a point by point fashion, the displacement of the glass.

The fixed glass according to the invention provides good acoustic protection vis-a-vis noises, and in particular aerial and ground noises. The fixed glass according to the invention, as well as the peripheral joint according to the invention allow a sensible improvement in the sound reducing effect of the glass, and therefore the comfort of the vehicle, which is known to increase the driver's capacity to focus and reduces his fatigue. Therefore, this fixed glass and the peripheral joint act favorably upon safety in general.

BRIEF DESCRIPTION OF THE DRAWINGS

The following description and the figures will help in understanding the functioning of the invention and to comprehend all of its advantages.

DETAILED DESCRIPTION OF THE PREFERRED EMBODIMENTS

Figure 1:
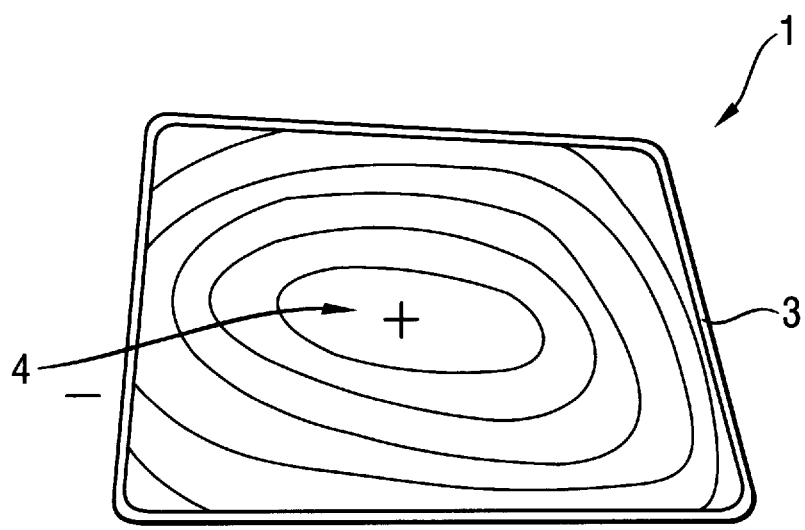
FIG. 1 represents the radiance of a classic fixed lateral glass window of a car.
Figure 2:
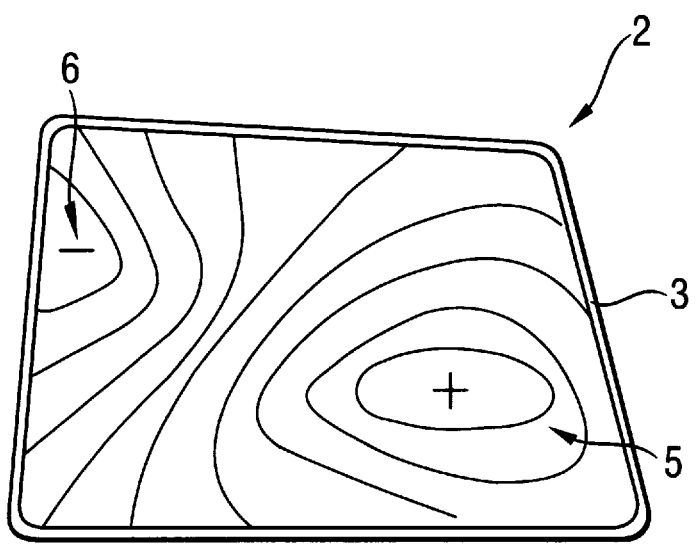
FIG. 2 represents the radiance of a fixed lateral window according to the invention.

FIGS. 1 and 2 represent, respectively, a fixed lateral window 1 and 2 of a car, both of which are composed, for example, of a monolithic tempered glass, of a thickness of 3 mm with glass of a silico-sodo-calcic base, in contact with a peripheral joint 3, this window being exited by an acoustic field. The two figures help to clarify the acoustic improvement brought about by the invention.

In FIG. 1, the fixed lateral window in contact with the peripheral joint 3 shows the radiance of a classic fixed window. By classic window is understood a window found generally on vehicles today, and that is not in conformance with the invention. The fixed lateral window 1 exited by an acoustic field presents only one zone of radiance 4.

This zone is represented by several concentric curves of equal displacement, the various levels corresponding here to the displacements due to the vibrations of the glass. The sign "+" represents the positive phase of the radiance, and the sign "−" represents the negative phase. This way, the zones in opposition of phase are represented by the signs "+" or "−".

FIG. 1 shows, by the radiance zone 4, that the total surface of the glass radiates in a single phase; in fact the entire surface moves in the same way. Therefore the active radiance of the glass covers the total surface of the glass.

In FIG. 2, the fixed lateral window in contact with peripheral joint 3 shows the radiance of a window according to the invention. Here, we observe two zones of radiance 5 and 6 with opposite phases replacing the single zone of radiance 4. The curves represent the displacement, making it apparent that when zone 5 moves in a certain direction, zone 6 moves in the opposite direction. Therefore an offset compensation effect appears, and the active radiance is much reduced as compared to that of FIG. 1. Due to this reduction of the active radiance, we therefore reduce the transmission of noise, and thereby improve the sound reducing effect inside the vehicle passenger area.

The representations of FIGS. 1 and 2 are only given as support for the explanation and do not represent any value of any particular measures. In fact, any measures represented would be of no interest in the description because such measures are particular to each type of vehicle and to each fixed glass of these vehicles.

Figure 3:
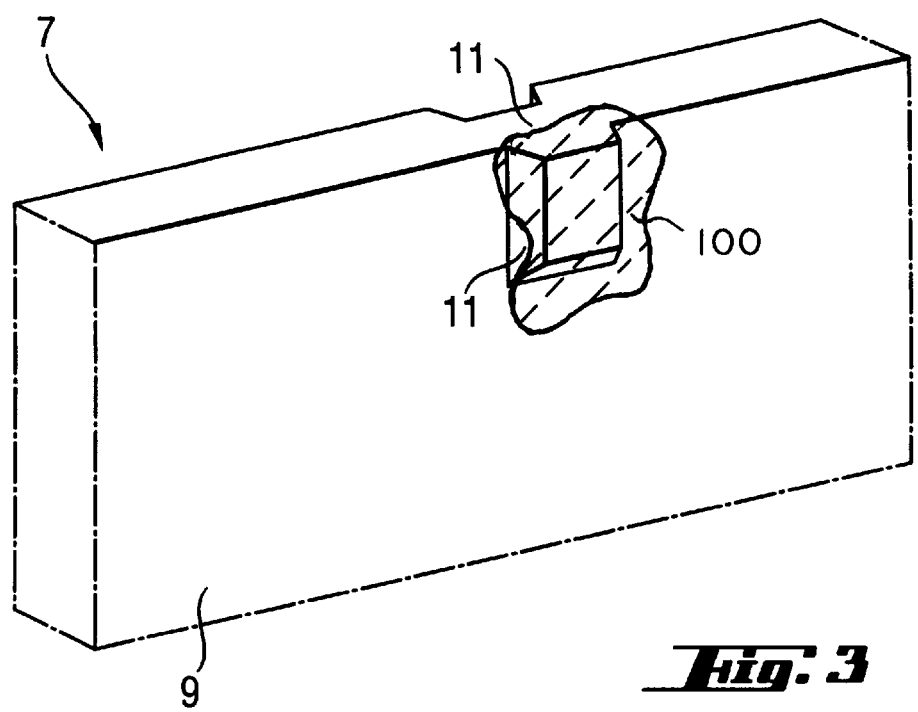
FIG. 3 represents the edge of the glass of a fixed lateral window according to the invention.
Figure 4:
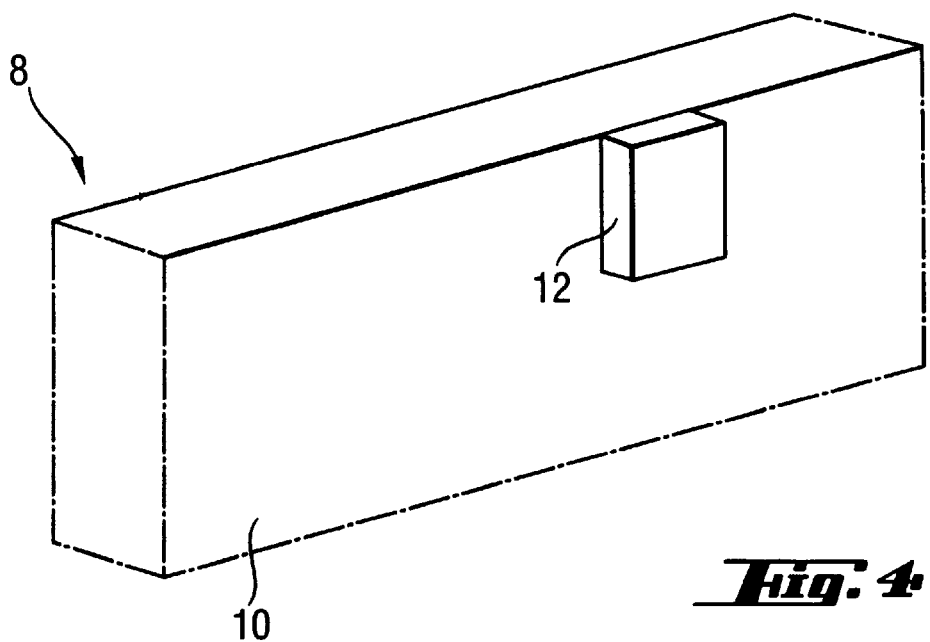
FIG. 4 represents the edge of the glass of another fixed lateral window according to invention.

FIGS. 3 and 4 represent the edge 7, 8 of a monolithic glass 9, 10 of a fixed lateral window 2 according to the invention, the edge 7, 8 coming into contact with a peripheral joint not represented here. According to FIG. 3, the edge 7 of the glass 9 presents a point of attachment 11 which is a local modification of the shape of the curve of the glass. Such a point of attachment 11 to the vehicle 100 can be obtained, for example, by pressing during the formation of the glass, or with a differential blowing on that zone during formation when the glass is in the process of being tempered. The point of attachment 11 presents, preferably, a thickness in the order of a millimeter. This way, when the glass is in contact with the peripheral joint, the hold of the glass 9 in the peripheral joint is locally increased due to the point of attachment 11 that reduces the displacement of the glass 9 locally in the peripheral joint According to FIG. 4, the edge 8 of the glass 10 shows an extra local thickness 12. Such an extra thickness 12 can be obtained, for instance, by gluing a plastic disk, or by engraving a ceramic disk on the glass. These disks 12 should have, preferably, the dimensions of 5 mm×10 mm×1 mm. This way, as for the point of attachment 11, the displacement of the glass 10 in the peripheral joint is locally reduced.

Figure 5:
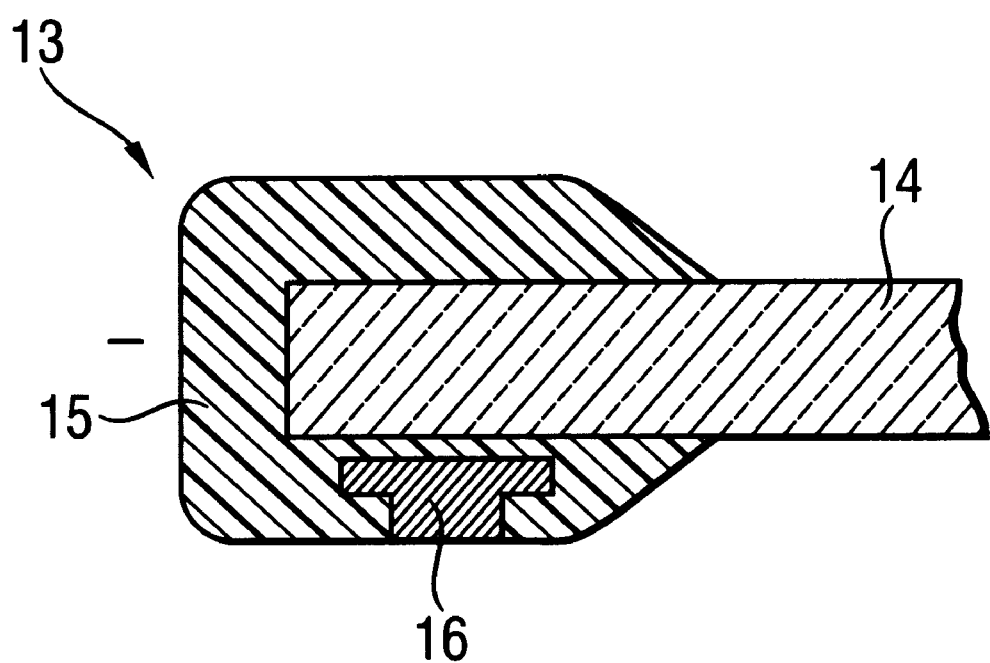
FIG. 5 represent the edge of the glass of a fixed lateral window in contact with a peripheral joint according to the invention.

FIG. 5 represents the edge 13 of a monolithic glass 14 of a fixed lateral window, in contact with a peripheral joint 15 with a modified thickness point by point in order to reduce the lateral displacement of the fixed lateral window in contact with a peripheral joint 15. The peripheral joint 15 is realized from a standard molded peripheral joint found normally on the fixed windows of vehicles.

According to FIG. 5, the peripheral joint 15 has an insert 16 as a hook or clip shrouded in its thickness. Such an insert 16 offers more strength than that of peripheral joint 15 and is made of, for instance, metal or plastic. According to the figure, it is integrated in the joint 15 in a way that is slightly touching the exterior side of the joint 15. It can also be slightly touching the edge of the glass or be totally shrouded in the thickness of the joint 15. The realization of such a joint 15 including an insert 16 does not present any difficulty for a specialist. The insert is, prior to the injection of material, positioned on the inside of the mold or on the edge of the glass, to keep it in place during the injection of the material, then shrouded in the hardened material during the opening of the mold.

The resulting joint allows the reduction of the lateral displacement of the window at the level of the insert 16.

The invention is not limited to these types of realizations, all types of fixed glass in contact with a peripheral joint and lacking at least one or more modes of radiance that are coupled with one or several modes of the cavity of the passenger cabin of the vehicle when the glass is exited by an acoustic field, are within the scope of the invention.

The advantages offered by the glass according to the invention are obvious: the acoustic protection is considerably improved without it being necessary to modify the structure of all the glass surfaces of the vehicle, resulting therefore in a lower cost.

What is claimed is:

1. A window pane fixed to a vehicle via a peripheral joint and forming at least a part of a wall defining a cabin of the vehicle, wherein the window pane, at the peripheral joint, comprises means for locally modifying the window pane at the peripheral joint to eliminate at least one mode of acoustic radiance from the window pane to a cavity defined by the cabin when said window pane is excited by an acoustic field.

2. The window pane according to claim 1, wherein said means for modifying comprises means for eliminating a first odd mode of acoustic radiance.

3. The window pane according to claim 1, wherein said means for modifying comprises means for eliminating all odd modes of acoustic radiance.

4. The window pane according to claim 1, wherein the window pane has at least one point of bending at its contact with the peripheral joint.

5. The window pane according to claim 1, wherein said means for modifying comprises increasing the thickness of the window pane comprising said pane at the peripheral joint.

6. The window pane according to claim 1, wherein the peripheral joint is constrained on at least one portion of its length.

7. The window pane according to claim 1, wherein said peripheral joint has a differential stiffness.

8. A window pane comprising a glass sheet part to a vehicle via a peripheral joint and forming at least a part of a wall defining a cabin of the vehicle, wherein the thickness of the glass part of the window pane is displaced at the peripheral joint, and at a location such that at least one mode of acoustic radiance from the pane to a cavity defined by the cabin is eliminated when said pane is excited by an acoustic field.

* * * * *

UNITED STATES PATENT AND TRADEMARK OFFICE
CERTIFICATE OF CORRECTION

PATENT NO. : 6,186,578
DATED : February 13, 2001
INVENTOR(S) : GARNIER et al.

It is certified that error appears in the above-identified patent and that said Letters Patent is hereby corrected as shown below:

On the title page, Item (73), the Assignee's residence is incorrect. Item (73) should read as follows:

(73) Assignee: Saint-Gobain Vitrage, Courbevoie (FR)

Signed and Sealed this

Fifth Day of June, 2001

Attest:

Attesting Officer

NICHOLAS P. GODICI

*Acting Director of the United States Patent and Trademark Office*